United States Patent
Zhang et al.

(10) Patent No.: US 11,953,126 B1
(45) Date of Patent: Apr. 9, 2024

(54) FLUID ROTARY JOINT ASSEMBLY SUITABLE FOR HIGH ROTATIONAL SPEED

(71) Applicant: Princetel, Inc., Hamilton, NJ (US)

(72) Inventors: Hong Zhang, Singapore (SG); Joe Ritacco, Hamilton, NJ (US); Boying B. Zhang, Hamilton, NJ (US)

(73) Assignee: PRINCETEL, INC., Hamilton, NJ (US)

( * ) Notice: Subject to any disclaimer, the term of this patent is extended or adjusted under 35 U.S.C. 154(b) by 0 days.

(21) Appl. No.: 18/305,312

(22) Filed: Apr. 21, 2023

(51) Int. Cl.
*F16L 27/087* (2006.01)

(52) U.S. Cl.
CPC ................... *F16L 27/087* (2013.01)

(58) Field of Classification Search
CPC ...... F16L 27/087; F16L 27/0828; F16L 39/04; F16L 39/06
See application file for complete search history.

(56) References Cited

U.S. PATENT DOCUMENTS

| | | | | |
|---|---|---|---|---|
| 2,626,166 A * | 1/1953 | Fawick | ................... | F16L 39/04 285/94 |
| 2,701,146 A * | 2/1955 | Warren | ................... | F16L 39/04 285/190 |
| 3,020,057 A * | 2/1962 | Gamet | ................... | F16L 39/04 279/4.12 |
| 4,111,467 A * | 9/1978 | de Fremery | ............ | F16L 39/06 285/190 |
| 4,286,686 A * | 9/1981 | Franke | ................... | F16L 39/04 192/85.34 |
| 4,652,189 A * | 3/1987 | Mizoguchi | ............ | F16L 27/087 408/239 R |
| 5,778,971 A * | 7/1998 | Szam | ................... | F16L 27/0828 137/340 |
| 2004/0144567 A1* | 7/2004 | Boyd | ................... | F16L 27/087 175/57 |

(Continued)

FOREIGN PATENT DOCUMENTS

| | | | | |
|---|---|---|---|---|
| CN | 111883994 A | * | 11/2020 | ............ F16L 27/087 |
| EP | 0499163 A1 | * | 8/1992 | ............ F16L 27/087 |

(Continued)

*Primary Examiner* — Matthew Troutman
*Assistant Examiner* — Fannie C Kee
(74) *Attorney, Agent, or Firm* — DANE IP Law PC; James C. Yang

(57) ABSTRACT

A fluid rotary joint assembly capable of high rotational speed exceeding a maximum rotational speed of a single rotary joint is disclosed herein. For example, the fluid rotary joint may be capable of exceeding rotational speeds greater than 1500 RPM. The fluid rotary joint assembly may have several single-stage fluid rotary joints and multiple gear devices wherein a relative speed between the first and second rotary parts of each single stage fluid rotary joint does not exceed a maximum rotary speed (e.g., 500 rpm). The fluid rotary joint assembly incorporates speed reduction within each stage through the gear device. By controlling the relative speed between the first and second parts of each of the fluid rotary joints to be less than or equal to a maximum allowable rotational speed (e.g., less than or equal to 500 RPM), the fluid rotary joint assembly provides for reliable operation at high rotational speeds between the first stage and the last stage.

7 Claims, 3 Drawing Sheets

(56) References Cited

U.S. PATENT DOCUMENTS

| | | | | |
|---|---|---|---|---|
| 2006/0082143 | A1* | 4/2006 | Pospisil | F16L 39/06 |
| | | | | 285/272 |
| 2007/0184934 | A1* | 8/2007 | Zhang | F16L 27/087 |
| | | | | 475/347 |
| 2008/0179482 | A1* | 7/2008 | van Amelsfoort | F16L 39/04 |
| | | | | 248/349.1 |
| 2012/0187675 | A1* | 7/2012 | Tausch | F16L 27/0828 |
| | | | | 285/272 |
| 2014/0363271 | A1* | 12/2014 | Wagemann | F16L 27/087 |
| | | | | 415/13 |
| 2020/0300397 | A1* | 9/2020 | Clifford | F16L 27/087 |
| 2021/0033228 | A1* | 2/2021 | Baldoni | F16L 39/04 |
| 2021/0277625 | A1* | 9/2021 | Bae | F16L 39/06 |

FOREIGN PATENT DOCUMENTS

| | | | | | |
|---|---|---|---|---|---|
| EP | 2138281 | A1 | * | 12/2009 | F16L 27/087 |
| GB | 2190161 | A | * | 11/1987 | F16L 27/087 |

* cited by examiner

FLUID ROTARY JOINT ASSEMBLY SUITABLE FOR HIGH ROTATIONAL SPEED

CROSS REFERENCE TO RELATED APPLICATIONS

Not Applicable.

STATEMENT RE: FEDERALLY SPONSORED RESEARCH/DEVELOPMENT

Not Applicable.

BACKGROUND

The various aspects and embodiments described herein relate to fluid rotary joint assembly for high rotational speeds.

A fluid rotary joint, also known as a fluid rotary union, is a mechanical device that allows fluids, or compressed gas, to flow between stationary and rotating parts of a system. It is commonly used in machines and equipment that require the transfer of fluid (such as liquids or gases) from a stationary source to a rotating component, or vice versa.

A fluid rotary joint typically consists of two main parts: a stationary part and a rotating part (also called stator and rotor). The stationary part is typically mounted to a fixed structure, while the rotating part is rotatable relative to the stationary part through bearings. The two parts are also connected by a sealed interface that allows fluid to flow from one part to the other.

A conventional fluid rotary joint consists of an input port on rotating part and an output port on stationary part. The input port and output port are connected each other by internal passages. The internal passages are sealed by multiple shaft seals and form a sealed rotational interface that allows fluid to flow between a port on one of the parts to the port on the other part, and vice versa.

A mechanical seal, also known as a mechanical face seal, is widely used in fluid rotary joint. It's a type of sealing device that is used in rotating machinery to prevent leakage of fluids or gases. It consists of two flat sealing faces that are held together by a spring-loaded mechanism. The sealing faces are usually made of hard materials, such as tungsten carbide or ceramic, to resist wear and corrosion. It's important to carefully select a mechanical seal that is designed to operate within the speed range of the system in which it will be used. If a mechanical seal is operated at speeds above its recommended limit, it may experience excessive wear, overheating, and other types of damage. This can result in leakage and other problems that can cause downtime and expensive repairs.

The typical rotational speed for a fluid rotary joint depends on several factors, such as the design of the joint, the type of fluid being transferred, and the operating conditions of the system. As understood, the maximum rotational speed of a fluid rotary joint depends on the design of the sealing mechanism and the type of fluid being transferred, as well as other factors such as temperature and pressure. In some applications, the rotational speed of the fluid rotary joint may be limited by factors such as the speed of the rotating component it is attached to, or by the need to minimize vibration and wear. In other applications, the joint may need to operate at high speeds in order to achieve efficient fluid transfer or to meet other performance requirements.

In some special applications, such as in high speed permanent magnet generators, in missile and gyro systems, it may be desirable to have a fluid rotary joint capable of operating at speeds up to 1500 RPM or at a rotational speed greater than the allowable rotational speed of a fluid rotary joint.

BRIEF SUMMARY

A multistage fluid rotary joint assembly for high rotational speed applications is disclosed.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
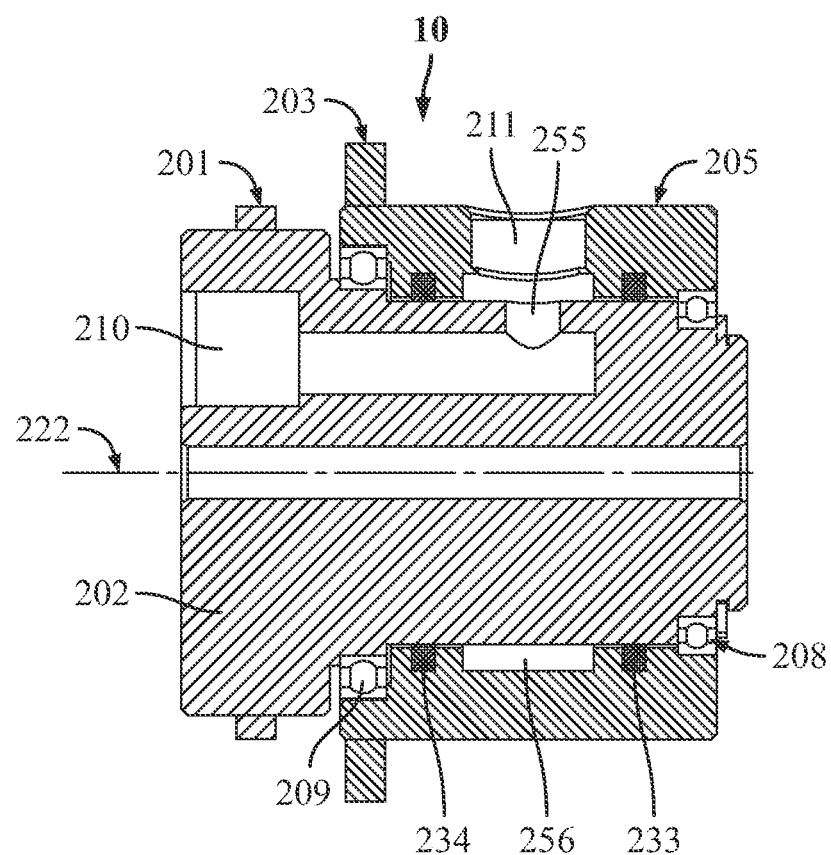
FIG. 1 shows a configuration of one of the fluid rotary joints within the multi stage fluid rotary joint assembly.

In FIG. 1, a configuration of one of the fluid rotary joints 10 of a multi-stage fluid rotary joint assembly is illustrated. This fluid rotary joint 10 consists of a first part 202 and a second part 205 that rotate around the axis 222 via ball bearings 208 and 209. The first part has an first port 210 on its surface, while the second part 205 has an second port 211. Although only one first and second ports 210, 211 is illustrated, any one stage can have multiple first and second ports 210, 211. Inside the first and second parts 202, 205 are respective first passage 255 and second passage 256 that are connected and sealed by shaft seals 233 and 234 to form a sealed rotational interface, allowing fluid to flow from the first port 210 to the second port 211, and vice versa.

The second part 205 of the fluid rotary joint assembly includes a driven gear 203, while the first part 202 has a driving gear 201. By way of example and not limitation, the speed limit for a single-stage fluid rotary joint may typically be around 500 RPM.

Figure 2:
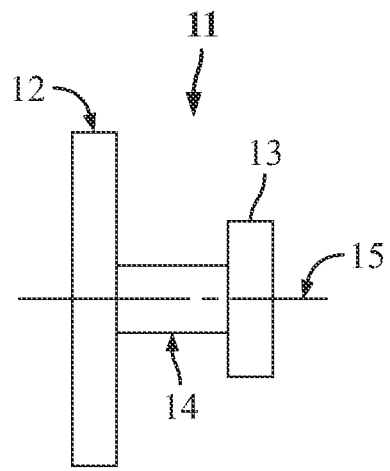
FIG. 2 shows a dual-gear assembly.

FIG. 2 depicts a dual-gear assembly 11 comprising a shaft 14 and two gears, gear 12 and gear 13, which are fixed onto the shaft. The gears and shaft are all rotational around the axis 15.

Figure 3:
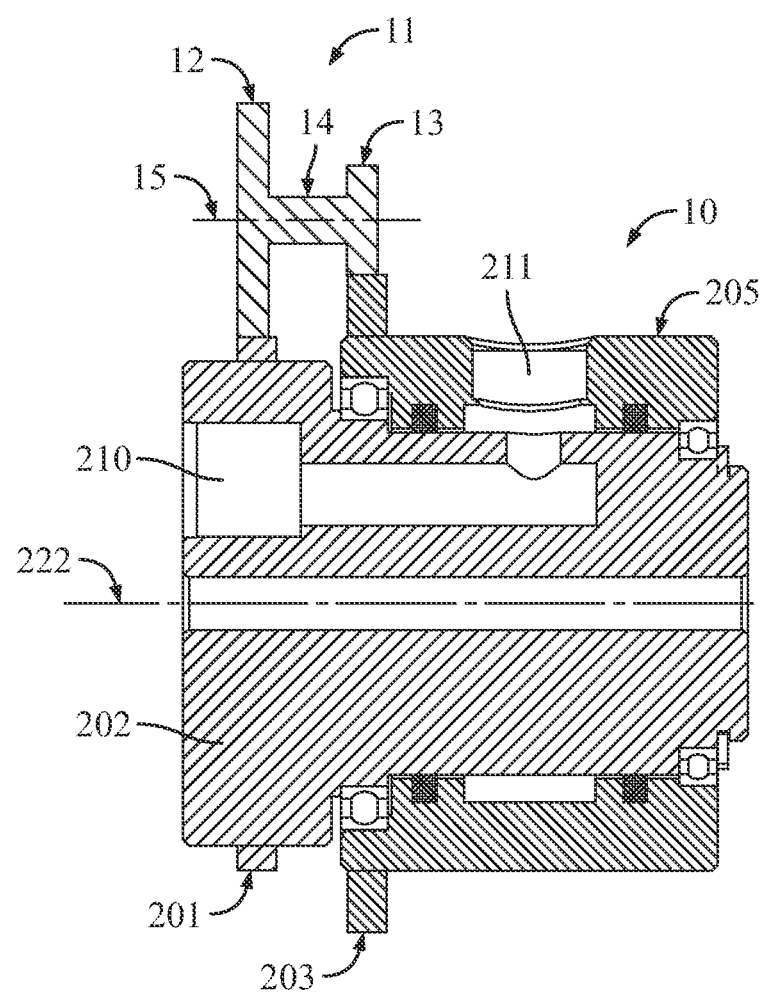
FIG. 3 shows the configuration of one of the stages within the multi stage fluid rotary joint assembly with the dual-gear assembly.

FIG. 3 shows the fluid rotary joint 10 with the dual-gear assembly 11. The gear 12 in the dual-gear assembly is engaged with the driving gear 201, while gear 13 is engaged with the driven gear 203. Each fluid rotary joint within each stage of the multi stage fluid joint assembly may have the dual-gear assembly 11. When the driving gear 201 and the first part 202 rotate at speed N1 RPM, the second part 205 rotates at speed N2 RPM due to the dual gear assembly 11. The speed ratio, N2/N1, depends on the number of teeth on the driving gear 201, gear 12, gear 13 in the dual gear assembly, and the driven gear 203.

Figure 4:
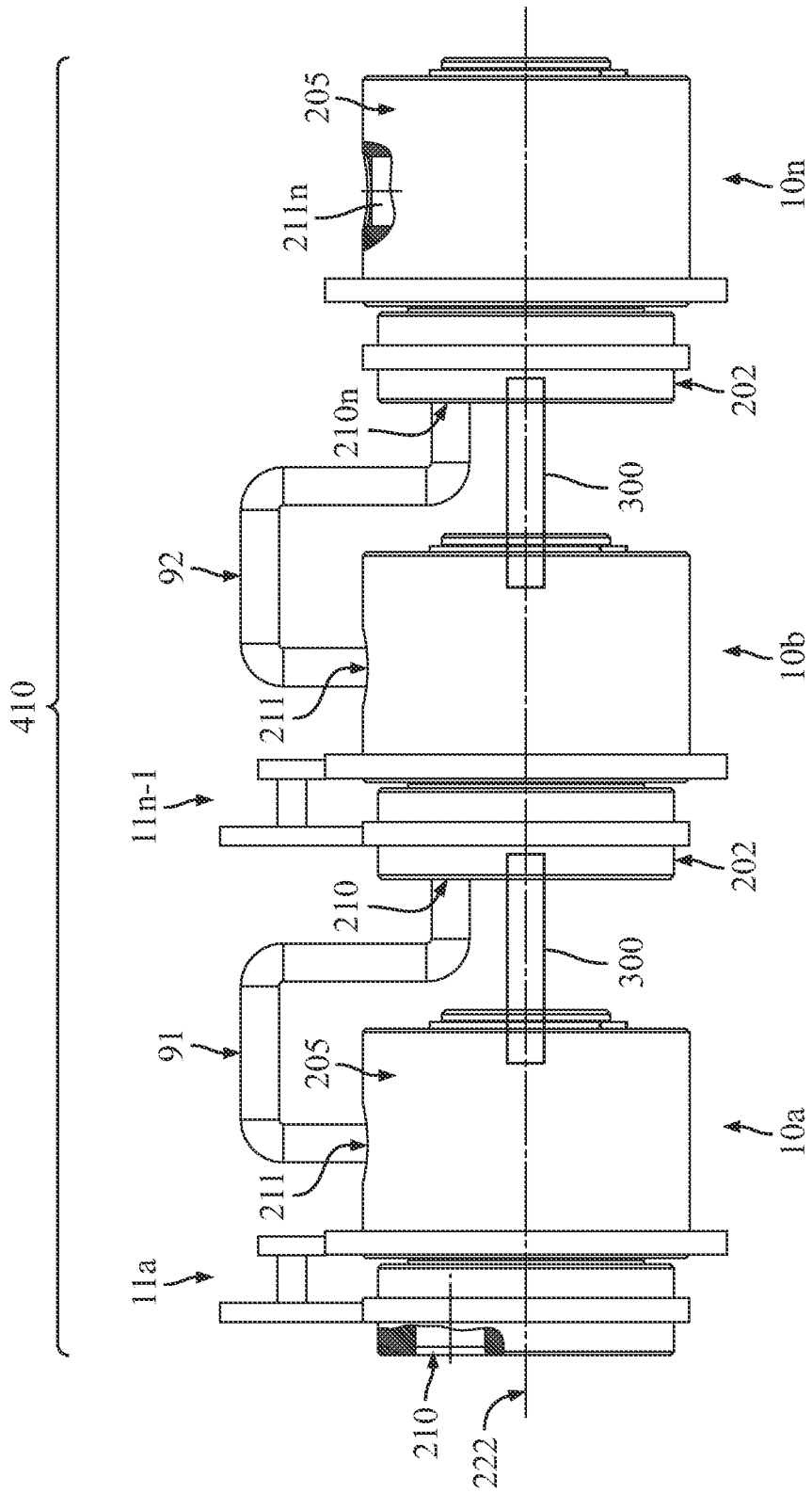
FIG. 4 illustrates an embodiment of the multi stage fluid rotary joint for high speed applications.

FIG. 4 depicts the preferred embodiment of the multistage fluid rotary joint assembly 410 for high-speed applications. It 410 comprises of n number of single stage fluid rotary joints 10a, . . . , 200n and n−1 dual-gear assemblies 11a, 11b, . . . 11n−1 connected in a series sequence. The second port 211 from the second part in the left most first stage (shown in FIG. 4) is connected to the first port 210 on the first part 202 of an adjacent second stage by a fluid communication channel 91 (e.g., pipe). Similarly, the second port 211 from the second part in the adjacent second stage is connected to the first port 210(n) on the first part 202 of the next adjacent stage by a fluid communication channel (e.g., pipe 92), and so on. The number of stages, n, can be any number. In an n-stage fluid rotary joint assembly, there will be n single stage fluid rotary joints 10 and n−1 dual-gear assemblies 11. In the last stage, the second part 205 may be stationary, while all other second parts of the other stages rotate due to the dual gear assembly. All first and second stationary parts of the fluid rotary joints within each stage may rotate, except the last second part, around the axis 222.

The dual gear assembly ensures that the relative speed between the first and second parts of each stage does not exceed a maximum allowable rotational speed therebetween for a fluid rotary joint. For instance, if an application required a maximum rotational speed of 1500 rpm and the maximum allowable rpm of current fluid rotational joints is 500 rpm, dual gear assembly can be designed (as shown in FIG. 3) to limit the relative rotational speed between the first and second parts 202, 205 of a fluid rotary joint of any one stage to be less than or equal to the current allowable maximum rpm between the first and second parts (e.g., less than or equal to 500 rpm) within each of the three stages of the multistage fluid rotary joint assembly.

The rotational speed of the second part 205 of a fluid rotary joint 10 within one of the stages of the multistage fluid rotary joint assembly 410 is fixed to a rotational speed of the first part 202 of a fluid rotary joint 10 within the next adjacent stage with a coupler 300.

Let Lambda 1, Lambda 2, Lambda n denote the gear ratios for stages 1, 2, . . . , n, respectively. Let R1, R2, . . . , Rn be the rotational speeds of the first rotating parts 202, . . . , and last first part 202, respectively. Similarly, let S1, S2, . . . , Sn denote the second parts' speeds, where Sn=0 for the last stage. Then, we can represent the speed relations using the following equations:

$S1 = R1/\text{Lambda 1}$, $S2 = R2/\text{Lambda 2}$, $R2 = S1, R3 = S2, \ldots$, $Rn = S(n-1)$ The relative speed between the first and second parts for each stage can be calculated as:

$R1 - S1 = R1(1 - 1/\text{Lambda1})$, $Rn - Sn = Rn(1 - 1/\text{Lambda } n)$.

As an example, consider a case where R1 is 1500 RPM and Lambda 1 is 1.5. Then S1 would be 1000 RPM, ensuring that the relative speed between R1 and S1 is 500 RPM. Similarly, if R2 is set to S1 at 1000 RPM and Lambda 2 is 2, then S2 and R3 will both be at 500 RPM. Therefore, for a 3-stage fluid rotary joint, the relative speed between the first and second parts in each stage is always 500 RPM. If a conventional fluid rotary joint can only have a relative rotational speed of 1500 rpm between the first and second parts, then 3 conventional fluid rotary joints can be assembled in series with the dual gear assembly and the couplers to have a maximum rotational speed within the assembly of 1500 rpm.

For another example, if the rotational speed of the first part, R1, is 3,000 RPM, a 6-stage fluid rotary joint system is required. By designing the gear ratio Lambda 1 to be 1.2, the speed of the second part, S1, can be 2,500 RPM, ensuring a relative speed between R1 and S1 of 500 RPM. Similarly, the speed of the first part, R2, is set to S1, which is 2,500 RPM. By designing the gear ratio Lambda 2 to be 1.25, the speed of the second part, S2, can be 2,000 RPM. This process continues for each stage until we reach the final stationary part, which remains stationary.

The multi stage fluid rotary joint assembly disclosed herein provides a solution for designing high-speed fluid rotary joint systems by using gear ratios for each stage. By selecting the appropriate number of stages and gear ratios, the relative speed between the first and second parts of each fluid rotary joint can be maintained at or below acceptable rotating speeds of conventional fluid rotating joints (e.g., 500 RPM). This ensures efficient and reliable performance of the joint system at high speeds.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A fluid rotary joint assembly for high speed applications, comprising:
   at least two single stage fluid rotary joints forming a multiple single stage fluid rotary joint assembly, each of the single stage fluid rotary joints connected in series to each other;
   at least one gear assembly connected to at least one of the at least two single stage fluid rotary joints, each gear assembly rotatable around a first common axis;
   each of the single stage fluid rotary joints further having:
   a first port on a first part, and a second port on a second part;
   multiple seals between the first and second parts;
   the first port of the first part being rotatable relative to the second port of the second part around a second common axis; and
   a coupler attached to the second part of a first single-stage fluid rotary joint of the at least two single stage fluid rotary joints and the first part of a second single-stage fluid rotary joint of the at least two single stage fluid rotary joints so that the second part of the first single-stage fluid rotary joint rotates about the second common axis with the first part of the second single stage fluid rotary joint.

2. A fluid rotary joint assembly for high speed applications, according to claim 1, wherein the each of the single stage fluid rotary joints further includes:
   a driven gear on the second part, a driving gear on the first part;
   a first passage on the first part connected to the first port, a second passage on the second part connected to the second port;
   the first passage and the second passage being connected to each other and sealed by the multiple seals to form a sealed rotational interface that allows fluid to flow between the first port and the second port; and the gears, the first part, and the second part being coaxially aligned on the second common axis and rotatable around the second common axis.

3. A fluid rotary joint assembly for high speed applications, comprising:
- at least two single stage fluid rotary joints forming a multiple single stage fluid rotary joint assembly, each of the single stage fluid rotary joints connected in series to each other;
- at least one gear assembly connected to at least one of the at least two single stage fluid rotary joints, each gear assembly rotatable around a first common axis;
- each of the single stage fluid rotary joints further having:
  - a first port on a first part, and a second port on a second part;
  - multiple seals between the first and second parts;
  - the first port of the first part being rotatable relative to the second port of the second part around a second common axis;
- the at least one gear assembly comprises multiple gear assemblies; and
- wherein each of the multiple gear assemblies is a dual gear assembly which is attached to gears on the first and second parts of the series connected at least two single stage fluid rotary joints.

4. A fluid rotary joint assembly for high speed applications, comprising:
- at least two single stage fluid rotary joints forming a multiple single stage fluid rotary joint assembly, each of the single stage fluid rotary joints connected in series to each other;
- at least one gear assembly connected to at least one of the at least two single stage fluid rotary joints, each gear assembly rotatable around a first common axis;
- each of the single stage fluid rotary joints further having:
- a first port on a first part, and a second port on a second part;
- multiple seals between the first and second parts;
- the first port of the first part being rotatable relative to the second port of the second part around a second common axis;
- the at least one gear assembly comprises multiple gear assemblies; and
- wherein each of the multiple gear assemblies is a dual gear assembly, and the second part of a first single stage fluid rotary joint in a first stage being mechanically connected to the first part of a second single stage fluid rotary joint in a second stage, the second part of the second single stage fluid rotary joint in the second stage being mechanically connected to the first part of a next single stage fluid rotary joint in a next stage, and the second port of the first stage being connected with the first port of the second stage by a fluid communication channel and the second port of the second stage being connected with the first port of a next stage by another fluid communication channel; for an n-stage fluid rotary joint assembly, there will be n single stage fluid rotary joints and the number of dual-gear assemblies will be n−1, the second part of a last stage being stationary, and all other second parts being rotatable.

5. A fluid rotary joint for high speed applications comprising:
- a first part having a first fluid port and a first gear on an external surface of the first part so that the first part and the first gear rotate synchronously with each other;
- a second part having a second fluid port and a second gear on an external surface of the second part so that the second part and the second gear rotate synchronously with each other, the first and second ports being in fluid communication with each other, wherein the first part is rotationally attached to the second part;
- a first passage on the first part connected to the first port, a second passage on the second part connected to the second port;
- the first passage and the second passage being connected to each other and sealed to form a sealed rotational interface that allows fluid to flow between the first port and the second port via the first and second passages;
- wherein the first and second parts rotate and the rotation of the first and second parts are aligned to a common rotational axis.

6. A fluid rotary joint for high speed applications, according to claim 5, further comprising a dual gear assembly, the dual gear assembly being engageable to the first and second gears on the first and second parts of the fluid rotary joint.

7. The fluid rotary joint of claim 5 further comprising:
- wherein the second part has a cylindrical cavity and the first part has a mating cylindrical body which rotates within the cylindrical cavity.

* * * * *